Jan. 3, 1967 T. C. STROPE 3,296,350
METHOD OF MAKING A SHOE HEEL
Original Filed May 23, 1962
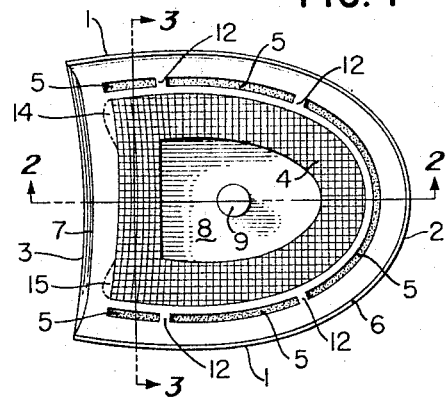
FIG. 1
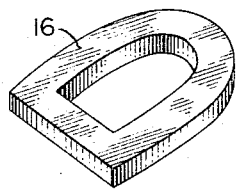
FIG. 4
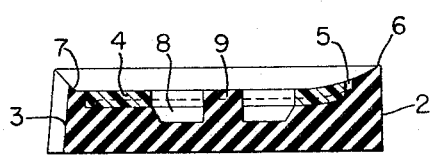
FIG. 2
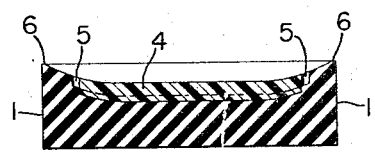
FIG. 3
FIG. 5
INVENTOR.
THOM C. STROPE
BY
*J.B. Holden*
ATTORNEY

United States Patent Office 3,296,350
Patented Jan. 3, 1967

3,296,350
METHOD OF MAKING A SHOE HEEL
Thom C. Strope, Stow, Ohio, assignor to The Goodyear Tire & Rubber Company, Akron, Ohio, a corporation of Ohio
Original application May 23, 1962, Ser. No. 197,004, now Patent No. 3,154,867, dated Nov. 3, 1964. Divided and this application Feb. 24, 1964, Ser. No. 351,883
5 Claims. (Cl. 264—266)

This is a division of application Serial No. 197,004 filed May 23, 1962, now Patent No. 3,154,867.

This invention relates to shoe heels and in particular to that type referred to in the trade as plastic core heels.

For many years, rubber and composition heels were manufactured with so-called washers embedded in the interior to facilitate nailing the heel to the upper. In large manufacturing facilities, the nailing of such heels by machine presented very little difficulty. However, the repair trade experienced some problem, since many times no equipment was available accurately to position the nails so that each nail went through the center of a washer and the repairman often could not afford expensive automatic nailing devices. In order to assist in this difficulty, shoes having centrally located cores of wood, fiber, etc., were produced so that the repairman could place nails in almost any position in the central portion of the heel and remain certain of securing a firm nailing by penetrating the core. However, moisture absorption and other effects made such heels less than satisfactory and in order to avoid such problems the so-called plastic core heel was developed. Such cores or inserts, although referred to as "plastic" may be made of a variety of relatively hard, usually initially thermoplastic, organic materials, but preferably are of elastomer-resin blends which may become initially flowably softenable and may be thermally cured along with and to the outer rubber portion of the heel.

In the process of curing such heels, the cores when placed in hot heel molds usually soften and become flowable in a relatively short time. As a result, in an ordinary mold when the mold is closed and the core put under pressure by the rubber biscuit which forms the tread, sides and back of the heel, the core tends to squirt to the edge of the heel and cure or set in that location. This produces an unsightly product and also a defective heel since the core area is at least partly formed of rubber which will not satisfactorily hold a nail.

It has been suggested heretofore to use a dam or wall in the mold adjacent the sides and back of the heel, which is continuous or flat from a point adjacent the breast edge of the heel at one side to a similar point adjacent the breast edge at the other side, as a solution to the plasticity or flow problem. A heel made in such fashion has a surface which is continuous from the breast edge to a point adjacent the central portion of the heel, but has a groove continuous around the sides and back separating the insert from the rubber. However, heels made in such fashion have not been entirely satisfactory, since the flat and relatively inflexible breast portion does not provide an adequate seal against water and dirt and also does not afford any flex or give to accommodate variations or imperfections in the bottom of the shoe upper. In addition, during the process of trimming and finishing the heel when on the shoe, there is a tendency for the rubber edge or side of the heel to flex out and be torn loose from the plastic core through the action of the machine used in such processes.

The present invention is directed towards avoiding such difficulties by providing a heel having a relatively hard plastic core bonded laterally to the rubber heel edges, by means of a number of selectively positioned bridges or ribs of rubber and plastic and a semi-flexible breast edge having a rand or raised portion to seal against the bottom of the shoe upper and yield to the contours thereof.

It is an object of the present invention to provide a method of making a heel having a nailable plastic core, said method providing improved flow control of the core or insert during vulcanization thereof.

It is a further object of the present invention to provide a heel having improved adhesion between the core and the rubber portions.

These and other objects of the present invention will become apparent from the following description and drawings in which:

FIG. 1 is a plan view of a heel made according to the present invention;

FIG. 2 is a section along line 2—2 of FIG. 1;

FIG. 3 is a section along line 3—3 of FIG. 1;

FIG. 4 is an isometric of an uncured core used to make a heel of the present invention; and FIG. 5 is a drawing depicting generally the sequence of steps in molding a heel according to the present invention.

Referring to the drawings, in FIG. 1 there is illustrated a heel having rubber sides 1, back 2, and breast edge 3 with a centrally located nail-retaining core or insert 4 made preferably of a curable elastomer-resin blend. The heel has a groove segment 5 along the side and back portions formed by a corresponding or complementary slotted dam in the mold which provides a flow control feature during vulcanization of the heel. The sides and back of the heel are provided with a relatively high raised edge or rand 6 and the breast edge is provided with a similar but somewhat lower raised edge or rand 7, as may be more clearly seen in FIGS. 2 and 3. As is usual in heels of this type, the center area is cored or hollowed partially as at 8 to reduce heel weight. A centrally located raised knob or boss 9, usually of rubber, provides additional foot support in the hollowed area. The corresponding boss 10 and cavity 11 in the mold may be seen in FIG. 5.

An important feature of the present invention may be seen in the lateral bridges 12, spanning the grooves 5 in the heel which are produced by selectively slotting or grooving the dam 13 in the mold. The bridges not only provide means for improving adhesion between the rubber edges of the heel and the core sides to resist separation of the two during trimming operations but the slots in the mold dam, if properly selected, provide a flow control to assure that the core maintains position and the flow is predominantly in the direction towards portions of the heel where presence of the plastic is desirable and away from the portions where flow is not acceptable.

The latter may be more fully understood by considering that some flow of the core towards the breast edge at the portions 14 and 15 may be desired in order to enlarge the area through which the repairman may nail, thus reducing the precision required. By slotting the dam or wall 13 in the lateral or side portions to provide pressure relief, while retaining the rear or back portion continuous, flow toward the breast edge of the heel is encouraged but excessive pressures which might occur due to an oversized core are relieved by the lateral slots or vents and flow held within tolerable limits. At the same time, laterally extending ribs are formed between the rubber sides of the heel and the plastic core which enhance the shear strength of the structure. Through this controlled flow feature some harder plastic extends towards the breast edge of the heel but not sufficiently far as to destroy the essential flexibility of the rubber rand at the breast which effects an efficient seal between the shoe bottom and the upper heel surface. It is apparent that an uncured core 16, such as illustrated in FIG. 4, may vary considerably in dimension, particularly in thickness, and nonetheless be accommodated in the mold. If the core is slightly undersized, more rubber will flow through the slots towards the edges of the insert to effect a bond while a slightly oversized core will result in an outward flow of plastic through the slots into contact with the rubber. In either case the continuous back portion of the dam or wall tends to cause moderate laminar flow towards the breast edge, which is also controlled by the stippling 17 as well as the relief slots in the dam. It has been found that the lateral slots in the dam should preferably be limited in number and width so that the proper flow ranges are maintained. While this may vary somewhat with the size of the heel and the rheological characteristics of the materials involved, there should be at least two, but not more than about five, lateral slots on each side to provide flow control and the strengthening ribs. Further, the slot width should be of the order of the dimension of the dam thickness.

FIG. 5 illustrates the sequence of forming a heel of the present invention. Prior to loading the mold, the hot mold from the previous cure is dipped in a water bath to lower the temperature from that utilized during cure, which may be from 310° F. to 350° F. to about 275° F. to 320° F. in order to reduce the rate of softening of the core while a multiple cavity mold is being loaded. As shown in FIG. 5, the mold cavity 18 is first loaded with a green or uncured core, such as 16. Preferably, to insure that rubber is not forced between the core and the boss 10, the core is pressed firmly down around the boss until it contacts the stippled surface of the mold. A biscuit of rubber 19, which forms the tread and marginal portions of the heel, is placed on the nailing insert in the mold and the mold lid 20 is closed. The unit is then inserted in an autoclave or press and the heels cured. After cure, the finished heels are stripped from the mold, the flash cut off, and the mold is returned to the water cooling tank for the next cycle.

While certain representative embodiments and details have been shown for the purpose of illustrating the invention, it will be apparent to those skilled in this art that various changes and modifications may be made therein without departing from the spirit or scope of the invention.

I claim:
1. In the method of molding shoe heels by
 (1) charging a heel mold containing an insert flow barrier with (A) a thermoplastic nail retaining insert and (B) a curable rubber biscuit; and
 (2) applying sufficient heat and pressure to said mold to cause the rubber to surround the sides, back and breast of said insert and vulcanize said rubber,
the improvement comprising restricting flow of the insert, in a direction outwardly thereof, at spaced locations along said sides of the insert and continuously along the back of said insert, while permitting a restricted flow of said insert intermediate of said spaced locations and along the breast edge of said insert whereby the insert tends to remain centered in said heel.

2. An improved method of controlling the flow and location of a flowably softenable, plastic, nail retaining insert embedded in an elastomeric shoe heel which comprises:
 (1) placing said insert in the cavity of a heel mold having a flow barrier solely along the back and side margins of said insert, in spaced relation thereto, said flow barrier having pressure release openings along the side margins thereof,
 (2) placing a rubber charge on said insert, and
 (3) applying heat and pressure to said mold, thereby allowing flow of the insert toward the breast edge of the heel while said pressure release openings effect a reduction in the tendency of the insert to flow toward said breast edge and tend to maintain said insert spaced from said flow barrier.

3. A shoe heel mold having a cavity defined by breast, side and back walls, a flow barrier extending along said side and back walls only and spaced inwardly therefrom, said flow barrier having a number of pressure release openings along the side portions thereof.

4. A mold according to claim 3 wherein the pressure release openings have a depth substantially equal to the depth of the flow barrier.

5. A mold according to claim 4 wherein said pressure release openings are substantially symmetrical in their location on opposite sides of said flow barrier.

References Cited by the Examiner

UNITED STATES PATENTS

| 77,653 | 12/1904 | Foster | 264—241 X |
| 1,383,857 | 7/1921 | Ridout. | |
| 1,558,505 | 10/1925 | Ray | 264—241 X |
| 1,877,298 | 9/1932 | Goodwin. | |
| 2,985,919 | 5/1961 | Borroff et al. | |
| 2,985,920 | 5/1961 | Borroff et al. | |

FOREIGN PATENTS 807,466 10/1936 France.

ROBERT F. WHITE, *Primary Examiner.*

L. S. SQUIRES, *Assistant Examiner.*